(12) United States Patent
Philippoteau et al.

(10) Patent No.: US 10,700,370 B2
(45) Date of Patent: Jun. 30, 2020

(54) ELECTRICAL SYSTEM COMPRISING A STACK OF ELECTROCHEMICAL CELLS AND METHOD FOR CONTROLLING SAID SYSTEM

(71) Applicant: AREVA Stockage d'Energie, Aix en Provence (FR)

(72) Inventors: Vincent Philippoteau, Saint Martin le Vinoux (FR); André Rakotondrainibe, Aix en Provence (FR)

(73) Assignee: AREVA STOCKAGE D'ENERGIE, Aix en Provence (FR)

( * ) Notice: Subject to any disclaimer, the term of this patent is extended or adjusted under 35 U.S.C. 154(b) by 0 days.

(21) Appl. No.: 15/544,279

(22) PCT Filed: Jan. 12, 2016

(86) PCT No.: PCT/EP2016/050473
§ 371 (c)(1),
(2) Date: Jul. 18, 2017

(87) PCT Pub. No.: WO2016/116328
PCT Pub. Date: Jul. 28, 2016

(65) Prior Publication Data
US 2017/0352898 A1   Dec. 7, 2017

(30) Foreign Application Priority Data
Jan. 19, 2015   (FR) ...................... 15 50410

(51) Int. Cl.
*H01M 8/04*      (2016.01)
*H01M 8/04858*   (2016.01)
(Continued)

(52) U.S. Cl.
CPC ....... *H01M 8/0488* (2013.01); *H01M 8/0491* (2013.01); *H01M 8/0494* (2013.01);
(Continued)

(58) Field of Classification Search
CPC ......... H01M 8/04552; H01M 8/04559; H01M 8/0488; H01M 8/04888; H01M 8/0491; H01M 8/0494
See application file for complete search history.

(56) References Cited

U.S. PATENT DOCUMENTS 6,428,917 B1    8/2002 Lacy et al.
2004/0170038 A1  9/2004 Ichinose et al.
(Continued)

FOREIGN PATENT DOCUMENTS

CN    102810685 A    12/2012
EP     2131471 A1    12/2009
(Continued)

OTHER PUBLICATIONS

Corresponding PCT International Search Report.

*Primary Examiner* — Gary D Harris
(74) *Attorney, Agent, or Firm* — Davidson, Davidson & Kappel, LLC (57) ABSTRACT

An electrical system includes a stack (3) of electrochemical cells (5), a power converter (9) electrically connected to the stack (3), a voltage comparator (7) for comparing the voltage at the terminals of at least one group of at least one electrochemical cell (5) of the stack (3) to a threshold voltage, and a control module (11) for controlling the converter (9). The control module (11) includes a generator (74) for generating a control instruction for controlling the converter (9) and a transmission member (76) for transmitting the control instruction to the converter (9). The voltage comparator (7) is suitable for transmitting a signal to the transmission member (76). The signal consists of a first instruction from an instruction for transmitting and an instruction for blocking the control instruction when the compared voltage is higher than the threshold voltage, and a second instruction from the instructions for transmitting (Continued)

and blocking the control instruction when the compared voltage is lower than or equal to the threshold voltage.

15 Claims, 7 Drawing Sheets

(51) Int. Cl.
    *H01M 8/04537*     (2016.01)
    *H01M 8/04828*     (2016.01)

(52) U.S. Cl.
    CPC ... *H01M 8/04552* (2013.01); *H01M 8/04559* (2013.01); *H01M 8/04888* (2013.01)

(56) References Cited

U.S. PATENT DOCUMENTS

| | | |
|---|---|---|
| 2005/0048335 A1 | 3/2005 | Fields, III et al. |
| 2006/0088743 A1* | 4/2006 | Gallagher ......... H01M 8/04097 429/431 |
| 2007/0116135 A1 | 5/2007 | Tsuchida |
| 2011/0266875 A1 | 11/2011 | Shimura et al. |
| 2011/0291042 A1 | 12/2011 | Li et al. |
| 2012/0308850 A1 | 12/2012 | Bernard |
| 2018/0037623 A1 | 2/2018 | Guo et al. |
| 2018/0198289 A1* | 7/2018 | Sugeno ................ H02J 7/0016 |

FOREIGN PATENT DOCUMENTS

| | | |
|---|---|---|
| EP | 2530780 A1 | 11/2011 |
| JP | S63294216 A | 11/1988 |
| JP | H09055219 A | 2/1997 |
| JP | H11144749 A | 5/1999 |
| JP | 2001210346 A | 8/2001 |
| JP | 2004265671 A | 9/2004 |
| JP | 2007142914 A | 6/2007 |
| JP | 2017537926 | 12/2017 |

\* cited by examiner

ELECTRICAL SYSTEM COMPRISING A STACK OF ELECTROCHEMICAL CELLS AND METHOD FOR CONTROLLING SAID SYSTEM

The present invention relates to an electric system, of the type comprising:
- a stack of electrochemical cells electrically connected in series with each other, so that the voltage on the terminals of the stack is equal to the sum of the voltages on the terminals of the electrochemical cells,
- an electric converter electrically connected to the terminals of the stack,
- a voltage comparator for comparing the voltage on the terminals of at least one group of at least one electrochemical cell of the stack with a threshold voltage, and
- a control module of the converter.

The invention also relates to a method for controlling this electric system.

BACKGROUND

Electrochemical cells are known which allow production of electricity by an oxidation-reduction reaction between an oxidizing fluid and a reducing fluid. Notably, cells of a fuel cell are known allowing production of electricity by an oxidation-reduction reaction between a fuel, comprising hydrogen, and an oxidizer, comprising oxygen. The fuel is injected into an anode conduit and the oxidizer is injected into a cathode conduit of the cell, an electrolyte layer ensuring the seal between both of these conduits, allowing ion exchanges. Because of these ion exchanges, the hydrogen contained in the fuel may react with the oxygen contained in the fuel in order to produce water, by generating electrons at the anode. This ensues, during operation of the cell, the establishment of a potential difference between both sides of the electrolyte, this potential difference may be utilized for generating an electric current.

However, the potential differences established within a cell of a fuel cell remain low, of the order of 0.6 to 1.0V. Also, in order to obtain an utilizable output voltage, the cells are most often stacked and electrically connected in series with each other, within what is commonly called a fuel cell.

The fuel cell is generally electrically connected to an electric converter giving the possibility of shaping a current leaving the fuel cell for its consumption by a load. The electric converter is controlled by a control module which acts on the converter so that the current leaving the converter is adapted to the load. The control module typically adjusts the voltage of the output current and when the output current is an alternating current, the frequency of the output current.

The most often, the fuel cell is equipped with an emergency stopping module for stopping the fuel cell in the case of malfunction, for example in the case of a loss of seal of the electrolyte layer of one of the cells. The emergency stopping module is generally associated with a unit measuring the voltage on the terminals of the cells of the fuel cell in order to detect said malfunction.

A problem currently encountered on known fuel cells is that the emergency stopping untimely triggers because of a too large electric power being taken on the fuel cell. This occurs in particular when the fuel cell is cold and that the requested power increases suddenly, or when the fuel cell is old and has limited performances.

U.S. Pat. No. 6,428,917 proposes regulation of the maximum output current leaving the fuel cell. For this purpose, U.S. Pat. No. 6,428,917 proposes an electric energy production system with a fuel cell comprising a control module programmed for inferring a maximum output current at the outlet of the fuel cell from the comparison between the lowest cell voltage and a threshold voltage, and for transmitting to the electric converter a set value representative of said maximum current.

However, this production system requires computers carrying out complex operations. Accordingly, the production system is difficult to produce and is costly. Further, the control module is not very adaptive for fuel cells having a large number of electrochemical cells, for example greater than a hundred.

Electrochemical cells are also known giving the possibility of producing an oxidizing fluid and a reducing fluid by electrolysis of a third-party fluid. Notably, water electrolysis cells are known giving the possibility of producing hydrogen and oxygen. The water is injected into an anode or cathode conduit of the cell, an electrolyte layer ensuring the seal between both of these conduits, by allowing ion exchanges. Under the influence of an electric potential difference applied between both conduits, the water decomposes into positive hydrogen ions and into negative oxygen ions, the ions of a same sign migrating through the electrolyte layer to the other conduit of the cell. The oxygen ions are thus separated from the hydrogen ions. The oxygen ions then yield their electrons and are thus converted into dioxygen, while the hydrogen ions receive electrons and are thus converted into dihydrogen.

The electrolysis cells are most often stacked and electrically connected in series with each other, within what is currently called an electrolyzer.

The electrolyzer is generally electrically connected to an electric converter giving the possibility of shaping a supply current of the electrolyzer provided by an electric source. The electric converter is controlled by a control module which acts on the converter so that the current leaving the converter is adapted to the electrolyzer. The control module typically adjusts the voltage of the supply current.

Most often, the electrolyzer is equipped with an emergency stopping module for stopping the electrolyzer in the case of a malfunction, for example in the case of over voltage on the terminals of one of the cells. The emergency stopping module is generally associated with a unit measuring the voltage on the terminals of the cells of the electrolyzer in order to detect said malfunction.

The known measurement units are however not very suitable for measuring the voltages on the terminals of the cells of large electrolyzers comprising typically more than a hundred electrochemical cells.

SUMMARY OF THE INVENTION

A goal of the invention is to avoid untimely safety stops. Other goals are to increase the lifetime of the stacks of electrochemical cells, and to propose a simple and not very costly system.

For this purpose, an electric system of the aforementioned type is provided, wherein the control module comprises a generator of a set value for controlling the converter and a unit for transmitting the control set value to the converter, the voltage comparator being adapted for transmitting a signal to the transmission unit, said signal consisting in a first set value from among a transmission set value and a set value for blocking the control set value when the compared voltage is greater than the threshold voltage, and in a second set value from among the transmission and blocking set values of the control set value when the compared voltage is less than or equal to the threshold voltage, the transmission unit being adapted for transmitting the set control value to the converter when it receives the transmission set value, and for blocking the control set value when it receives the blocking set value.

According to particular embodiments of the invention, the electric system also comprises one or several of the following features, taken individually or according to all the technically possible combination(s):

each electrochemical cell of the stack belongs to a group, the voltage of which is compared with a threshold voltage by the voltage comparator;

the voltage comparator is adapted for comparing the voltage on the terminals of each group of a plurality of groups of at least one electrochemical cell to a threshold voltage associated with said group, and for transmitting to the transmission unit the second set value as soon as one of the compared voltages is less than or equal to the associated threshold voltage;

the associated threshold voltage with each group is substantially equal to the threshold voltage associated with each other group;

the transmission unit comprises a controlled switch controlled by the transmitted signal by the voltage comparator, the controlled switch being in particular a transistor, for example a phototransistor or a field effect transistor with a metal-oxide gate;

the voltage comparator is adapted for individually comparing the voltage on the terminals of each electrochemical cell of the stack with a threshold voltage associated with the electrochemical cell; and for transmitting to the transmission unit the second set value as soon as one of the compared voltages is less than or equal to the associated threshold voltage;

the threshold voltage associated with each cell is substantially equal to the threshold voltage associated with each other cell;

the voltage comparator comprises, for each electrochemical cell of the stack, a device for controlling the voltage on the terminals of said cell, and a voltage-regulating device, electrically connected to said cell so that the control device measures the voltage on the terminals of the cell, lowered by a shift voltage on the terminals of the regulating device;

the voltage comparator comprises, for each electrochemical cell of the stack, a device for controlling the voltage on the terminals of said cell, and a voltage-regulating device, electrically connected to said cell so that the control device measures the voltage on the terminals of the cell, increased by a shift voltage on the terminals of the regulating device;

the shift voltage is fixed;

the regulating device is a passive device such as a diode;

the regulating device is electrically connected, through a first terminal, to a terminal of a consecutive cell of the stack, common with the cell for which the voltage is measured, and, through a second terminal, to the other terminal of said consecutive cell;

the first terminal of the regulating device is a direct electric connection with the terminal common to the cell, the voltage of which is measured and to the consecutive cell;

a resistor is electrically inserted between the second terminal of the regulating device and the terminal of the consecutive cell to which is connected said second terminal;

the control device comprises an inlet connected to a terminal of the cell on the one hand, the voltage of which is measured, and to the second terminal of the regulating device on the other hand;

the control device is an active optical element;

the control device comprises an outlet for constructing an image of the measured voltage, the outlets of at least two of the control devices being electrically connected in series with each other;

the electric system comprises a voltage sensor for measuring the voltage on the terminals of the stack and a module for detecting a malfunction of the stack, the detection module having as inputs the voltage measured by the voltage sensor and the signal transmitted by the voltage comparator to the transmission unit;

the detection module is programed for comparing the measured voltage with a maximum voltage, and for emitting a stack malfunction signal when the measured voltage is greater than the maximum voltage and the signal transmitted by the voltage comparator to the transmission unit consists in the blocking set value;

the electric system comprises a current sensor for measuring the intensity of the current leaving the stack and a module for detecting a malfunction of the stack, the detection module having as inputs the intensity measured by the current sensor and the signal transmitted by the voltage comparator to the transmission unit;

the detection module is programed in order to compare the measured intensity with a minimum intensity, and for emitting a stack malfunction signal when the measured intensity is less than the minimum intensity and the signal transmitted by the voltage comparator to the transmission unit consists in the blocking set value.

A method for controlling an electric system as defined above is also provided, comprising the following steps:

comparing the voltage on the terminals of at least one group of at least one electrochemical cell with a threshold voltage, the compared voltage being greater than the threshold voltage, the converter being in an operating state, detection of the lowering of the compared voltage with a value of less than that of the threshold voltage, stopping the converter, detecting the increase in the voltage compared with a value greater than that of the threshold voltage, and restarting the converter.

A method for controlling an electric system as defined above is also provided, comprising the following steps:

comparing the voltage on the terminals of at least one group of at least one electrochemical cell with a threshold voltage, the compared voltage being less than the threshold voltage, the converter being in an operating state, detecting the rise in voltage compared with a value greater than that of the threshold voltage, stopping the converter, detecting the lowering of the voltage compared with a value less than that of the threshold voltage, and restarting the converter.

BRIEF SUMMARY OF THE DRAWINGS

Other features and advantages of the invention will become apparent upon reading the description which follows, only given as an example and made with reference to the appended drawings, wherein.

DETAILED DESCRIPTION

Figure 1:
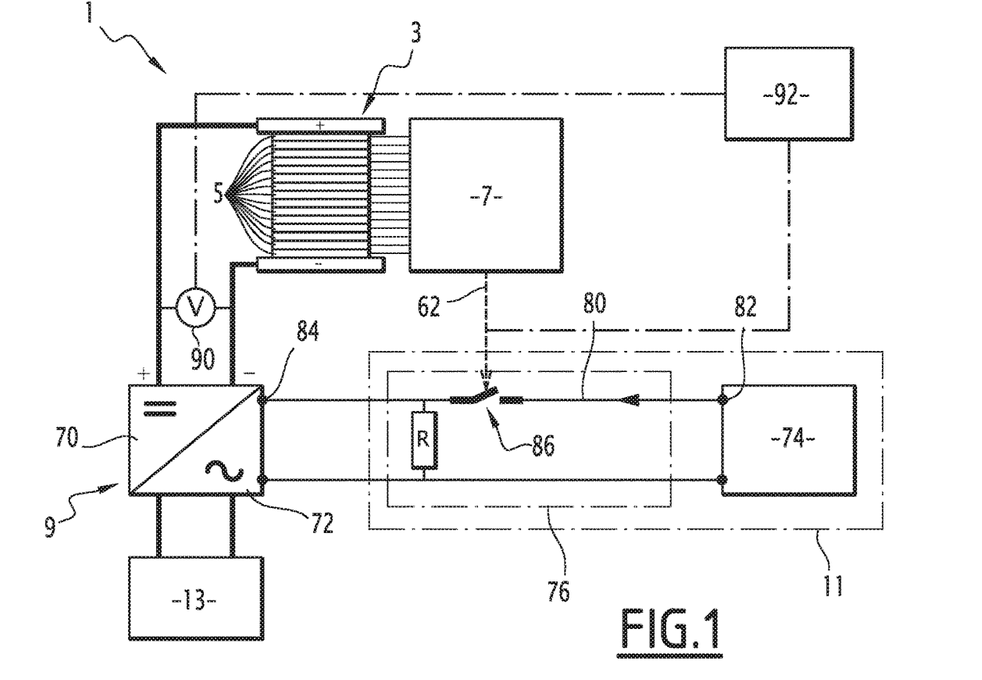
FIG. 1 is a schematic view of an electric system according to a first embodiment of the invention, electrically connected to a load.

The electric system 1, illustrated in FIG. 1, is a system for producing electric energy. It comprises a fuel cell formed by a stack 3 of electrochemical cells 5, for generating an electric current from an oxidizing fluid and from a reducing fluid, a voltage comparator 7 for individually comparing the voltage on the terminals of each cell 5 of the fuel cell 3 with a threshold voltage, an electric converter 9 for converting the electric current generated by the fuel cell 3, and a controller or module 11 for controlling the converter 9. The electric system 1 is electrically connected to a load 13 for consumption of the electric energy produced by the system 1.

Figure 2:
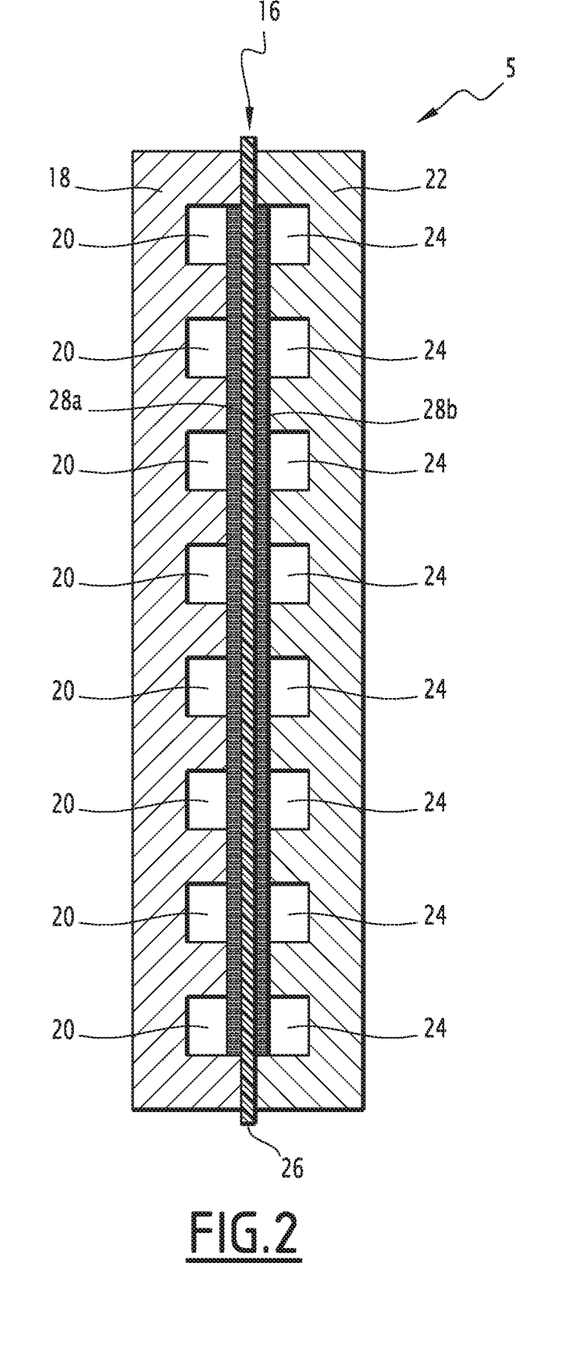
FIG. 2 is a schematic sectional view of an electrochemical cell of a fuel cell of the electric system of FIG. 1.

A cell 5 of the fuel cell 3 is illustrated in FIG. 2. It comprises a membrane-electrode assembly 16 inserted between an anode plate 18 and a cathode plate 22.

The membrane-electrode assembly 16 comprises an ion exchange membrane 26 sandwiched between an anode 28a and a cathode 28b.

The membrane 26 electrically insulates the anode 28a from the cathode 28b.

The membrane 26 is adapted for only letting charged ions, preferably cations cross it. The membrane 26 is generally a proton exchange membrane, adapted for only letting protons cross it. The membrane 26 is typically in a polymeric material.

The anode 28a and the cathode 28b each comprise a catalyst, typically platinum or a platinum alloy, for facilitating the reaction.

The anode plate 18 delimits an anode conduit 20 for the circulation of a reducing gas along the anode 28a and in contact with the latter. To do this, the plate 18 is provided with at least one channel made in the face of the plate turned towards the membrane-electrode assembly 16 and closed by said membrane-electrode assembly 16. The anode plate 18 is formed with an electrically conductive material, typically graphite. The reducing gas used is a gas comprising dihydrogen, like for example pure dihydrogen.

The cathode plate 22 delimits a cathode conduit 24 for circulation of an oxidizing gas along the cathode 28b and in contact with the latter. To do this, the plate 22 is provided with at least one channel made in the face of the plate turned towards the membrane-electrode assembly 16 and closed by said membrane-electrode assembly 16. The cathode plate 22 is formed with an electrically conductive material, typically graphite. The oxidizing gas used is a gas comprising dioxygen, like for example pure dioxygen, air, or a reconstructed mixture of dioxygen and of a neutral gas, such as nitrogen or carbon-dioxide.

The membrane 26 separates the oxidizing and reducing gases. It is positioned between the anode plate 18 and the cathode plate 22 of the cell 5 and insulates the latter electrically from each other.

The anode 28a is in electric contact with the anode plate 18. The cathode 28b is in electric contact with the cathode plate 22. During the operation of the fuel cell, an oxidation of the reducing gas occurs at the anode 28a inducing the generation of electrons and protons. The electrons then pass in transit via the anode plate 18 towards the cathode 28b of the cell 5, or towards the cathode of another cell, in order to participate in a reduction of the oxidizing gas.

The cell 5 thus comprises two electric terminals: a negative electric terminal is formed by the anode plate 18, and a positive electric terminal is formed by the cathode plate 20.

The cell 5 is stacked with other similar cells, the anode plate 18 of each cell being in contact with the cathode plate 22 of the neighbouring cell. The anode and cathode plates 18, 22 thus ensure the transfer of the electrons to the reducing gas circulating in a cell towards the oxidizing gas circulating in another cell. The anode 18 and cathode 22 plates of both neighbouring cells of the stack are preferably made in the same material and therewith and together form a bipolar plate.

The cells 5 are electrically connected in series with each other, so that the voltage on the terminals of the stack 3 is equal to the sum of the voltages on the terminals of the cells 5.

Figure 3:
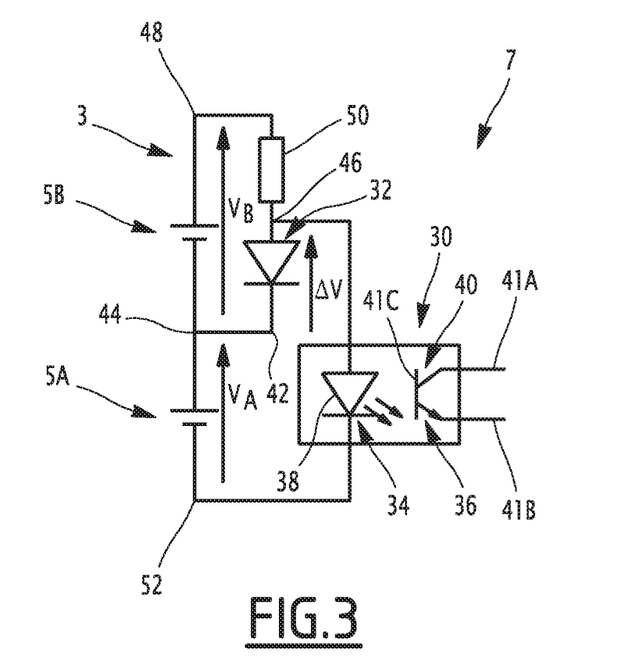
FIG. 3 is a schematic view of a detail of a voltage comparator of the electric system of FIG. 1, according to a first alternative of the first embodiment.
Figure 4:
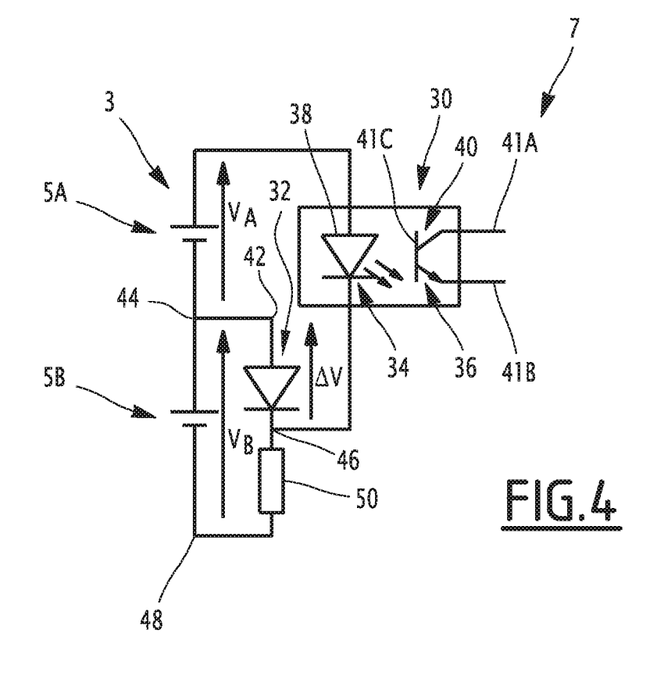
FIG. 4 is a view similar to that of FIG. 3, according to a second alternative of the first embodiment.

With reference to FIGS. 3 and 4, the voltage comparator 7 comprises, for each cell 5A of the stack 3, a device 30 for controlling the voltage on the terminals of said cell 5A. It further comprises a voltage-regulating device 32, laid out so that the control device 30 measures the voltage $V_A$ on the terminals of the cell 5A, increased by a fixed deviation voltage $\Delta V$.

The voltage $V_A$ is typically comprised between 0.5 and 1.0V, in normal operation of the cell 5A. The deviation voltage $\Delta V$ is the voltage on the terminals of the regulating device 32. Preferably, the deviation voltage $\Delta V$ is substantially equal to 0.3V.

The control device 30 is formed by an active optical device, typically an optocoupler. It comprises an inlet 34, electrically connected to the cell 5A, for measuring its voltage $V_A$, and an outlet 36 for constructing an image of the measured voltage $V_A$. The inlet 34 and the outlet 36 are electrically insulated.

The inlet 34 comprises a light-emitting diode 38, adapted for emitting photons when the voltage on its terminals is greater than a threshold voltage $V_{min}$. In normal operation of the cell 5A, the threshold voltage $V_{min}$ is less than the sum of the voltages $V_A$ and $\Delta V$, so that the light-emitting diode 38 emits photons. The threshold voltage $V_{min}$ is typically comprised between 0.8 and 1.2V.

The outlet 36 comprises a phototransistor 40 adapted so as to be in a closed configuration, i.e. electrically connecting its collector 41A and its emitter 41B to each other, when its base 41C receives photons, and for being in an open configuration, i.e. electrically insulating its collector 41A and its emitter 41B from each other when its base 41C does not receive any photons.

The phototransistor 40 is optically coupled with the light-emitting diode 38. In other words, the light-emitting diode 38 and the phototransistor 40 are laid out so that the photons emitted by the diode 38 reach the base 41C of the phototransistor 40. The passing of the phototransistor 40 from its open configuration to its closed configuration is thus controlled by the state of the light-emitting diode 38.

The regulating device 32 is a passive electric device. In particular, the regulating device 32 is a diode, typically a Schottky diode, advantageous because not very expensive and giving a fixed deviation voltage and which may be easily controlled. The diode is oriented so as to let through the currents from the high potential areas to the low potential areas. Thus, in normal operation, the voltage on the terminals of the regulating device 32, which is also the shift voltage $\Delta V$, is equal to the threshold voltage of the diode.

The regulating device 32 comprises a first terminal 42, electrically connected to a terminal 44 of a cell 5B of the stack consecutive to the cell 5A. In other words, the first terminal 42 is connected to the bipolar plate forming the separation between the cells 5A and 5B. The first terminal 42 is in a direct electric connection with the terminal 44 common to the cells 5A, 5B, i.e. there is no electric component interposed between the terminals 42 and 44.

The regulating device 32 also comprises a second terminal 46, electrically connected to the other terminal 48 of the consecutive cell 5B. In other words, the second terminal 46 is electrically connected to the plate 18, 22 of the cell 5B opposite to the contact face of the cell 5B with the cell 5A. A resistor 50 is inserted between the second terminal 46 and the terminal 48, for limiting the intensity of the current crossing the regulating device 32.

The input 34 of the control device 30 is connected to the second terminal 46 of the regulating device 32 on the one hand, and to the terminal 52 of the cell 5A other than the common terminal 44 on the other hand.

In the example illustrated in FIG. 3, the common terminal 44 is the terminal of the cell 5A having the highest potential. The consecutive cell 5B is then an upper cell of the stack. The regulating device 32 is oriented so that its terminal 42 is its lowest potential terminal. Thus, the voltage on the terminals of the input 34 is equal to the sum of the voltages $V_A$ and $\Delta V$.

In the example illustrated in FIG. 4, the common terminal 44 is the terminal of the cell 5A having the lowest potential. The consecutive cell 5B is then a lower cell of the stack. The regulating device 32 is oriented so that its terminal 42 is the highest potential terminal. Thus, the voltage on the terminals of the input 34 is equal to the sum of the voltages $V_A$ and $\Delta V$.

The control device 30 thus measuring the voltage $V_A$ of the cell 5A increased by the shift voltage $\Delta V$, the voltage $V_A$ may vary over a wider range before the voltage on the terminals of the input 34 of the control device 30 passes below the threshold voltage $V_{min}$.

Figure 5:
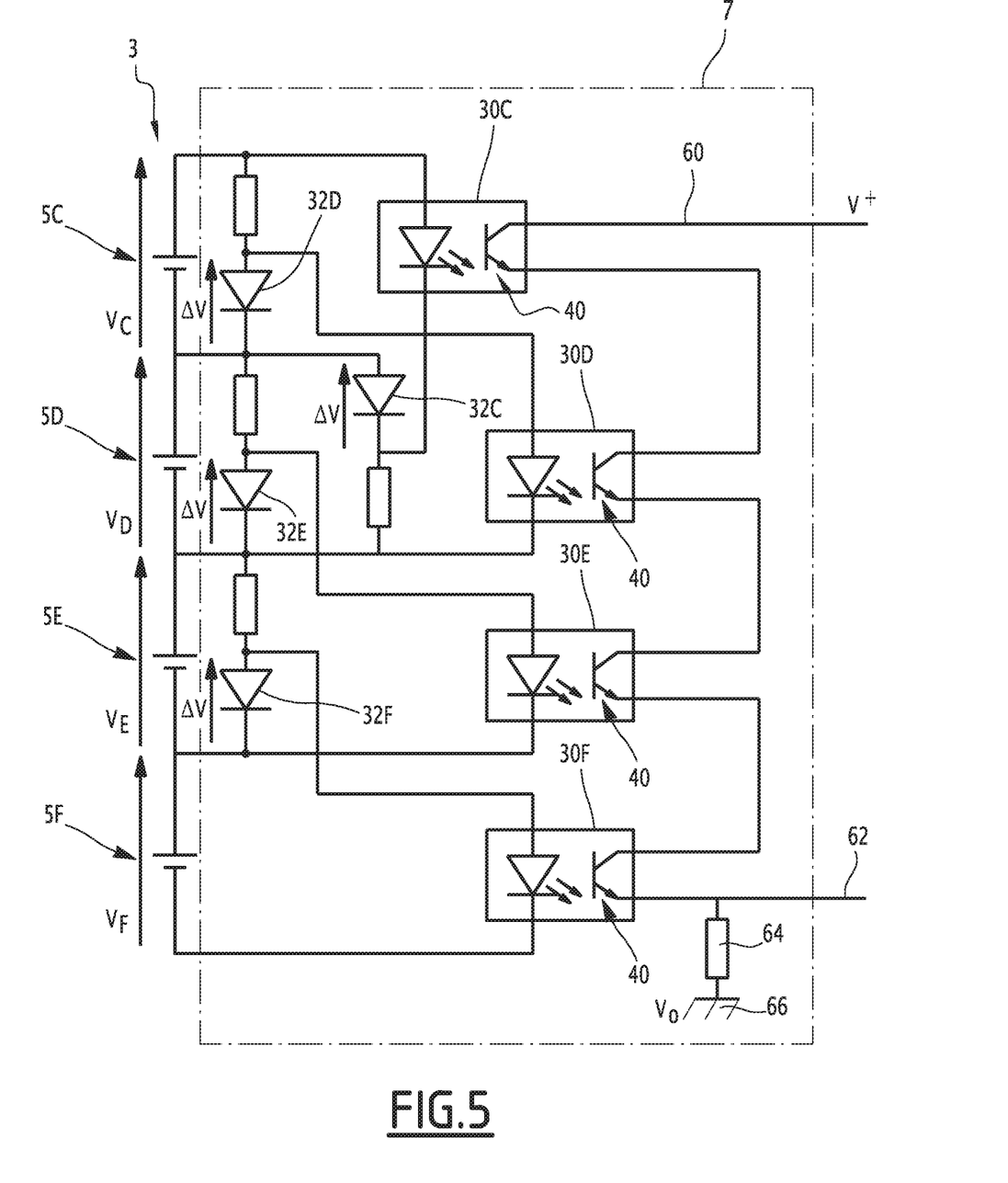
FIG. 5 is a schematic view of the voltage comparator of the electric system of FIG. 1.

With reference to FIG. 5, the voltages $V_C, V_D, V_E, V_F$ on the terminals of the cells 5C, 5D, 5E, 5F of the fuel cell 3 are each measured by a control device, 30C, 30D, 30E, 30F respectively of the voltage comparator 7. In the same way as for the cell 5A illustrated in FIGS. 3 and 4, a regulating device, 32C, 32D, 32E, 32F respectively is provided for each cell 5C, 5D, 5E, 5F, so that the associated control device 30C, 30D, 30E, 30F measures the voltage $V_C, V_D, V_E, V_F$ increased by a shift voltage $\Delta V$.

It will be noted that for reasons of clarity of the figure, the number of cells of the fuel cell 3 illustrated, was limited to four, but this number is by no means limiting, the stack 3 may comprise more or less than four electrochemical cells. Preferably, the stack 3 comprises a large number of electrochemical cells, for example greater than a hundred.

The threshold voltage $V_{min}$ is preferably substantially the same for all the control devices 30C, 30D, 30E, 30F, and the shift voltage $\Delta V$ is preferably substantially the same for all the regulating devices 32C, 32D, 32E, 32F. The minimum voltage of each cell 5C, 5D, 5E, 5F below which the associated phototransistor 40 opens is therefore substantially the same for all the cells 5C, 5D, 5E, 5F.

For each of the cells 5D, 5E, 5F, the consecutive cell to the terminals of which is connected the regulating device 32D, 32E, 32F is formed by the upper consecutive cell, respectively 5C, 5D, 5E. For the cell 5C, the consecutive cell to the terminals of which is connected the regulating device 32C is formed by the lower consecutive cell 5D.

The outputs 36 of the control devices 30C, 30D, 30E, 30F are connected in series with each other, between a positive potential $V^+$ (typically 5 volts) line 60 and an output line 62. A resistor 64 is interposed electrically between the line 62 and a reference potential line $V_0$ line 66.

Thus, as long as all the phototransistors 40 of the control devices 30C, 30D, 30E, 30F are closed, the potential of the output line 62 is equal to the positive potential $V^+$. If on the other hand the potential of the output line 62 passes to the reference potential $V_0$, it is a sign that one of the phototransistors 40 is open, and therefore excessive power is drawn from the stack 3.

Returning to FIG. 1, the converter 9 is adapted for putting the electric energy produced by the system 1 in a form so as to be consumed by the load 13. It comprises a DC current input 70 electrically connected to the terminals of the stack 3, and a current output 72 shaped, electrically connected to the terminals of the load 13. The converter 9 is in the illustrated example a DC/AC converter. Alternatively, the converter 9 is a DC/DC converter.

The converter 9 is controlled by the control module 11.

The control module 11 comprises a generator of a control set value 74 and a transmission unit 76 for the control set value to the converter 9.

The generator for the control set value 74 is programed so as to generate a control set value of the converter 9, for example of the pulse width modulation type, adapted so that the current leaving the converter 9 through its output 72 is adapted to the load 13. Such generators for a control set value are known to one skilled in the art.

The transmission unit 76 comprises an electric line 80 electrically connecting a terminal 82 so that the control set value of the generator 74 to a receiving terminal 84 for the control set value by the converter 9. The transmission unit 76 further comprises a control switch 86 for selectively opening and closing the electric line 80. The control switch 86 is typically a transistor, for example a phototransistor or a field effect transistor with a metal-oxide gate.

The voltage comparator 7 is adapted for transmitting a control signal of the control switch 86 to the transmission unit 76, said signal consisting in a transmission set value of the control set value when the voltage on the terminals of each cell 5 is greater than the voltage $V_{min}-\Delta V$, and in a blocking set value of the control set value as soon as one of the voltages on the terminals of the cells 5 is less than or equal to the voltage $V_{min}-\Delta V$, so that the transmission unit 76 transmits the control set value to the converter 9 when it receives the transmission set value, and blocks the control set value when it receives the blocking set value.

For this purpose, the output 62 of the voltage comparator 7 is electrically connected to the transmission unit 76.

In particular, in the case when the control switch 86 is a field effect transistor with a metal-oxide gate, the output 62 of the voltage comparator 7 is electrically connected to the gate of the transistor. In the case when the control switch 86 is a phototransistor, the output 62 is electrically connected to a light-emitting diode suitable for emitting photons when the voltage on its terminals is greater than a threshold voltage less than the positive potential $V^+$, the light-emitting diode being optically coupled with the phototransistor.

Thus, when the output 62 is at the positive potential $V^+$, the switch 86 is closed and the control set value is transmitted to the converter 9 and when the output 62 is at the reference potential $V_0$, the switch 86 is open and the control set value is not transmitted to the converter 9.

The signal transmitted by the output 62 to the transmission unit 76 therefore consists in an alternation of square waves at the positive potential $V^+$ and of square waves at the reference potential $V_0$, each square wave at the positive potential $V^+$ forming a transmission set value for the control set value, and each square wave at the reference potential $V_0$ forming a blocking set value of the control set value.

The load 13 is for example a motor or an electric network.

In the alternative illustrated in FIG. 1, the electric system 1 further comprises a voltage sensor 90, in order to measure the voltage on the terminals of the fuel cell 3, and a detector or module 92 for detecting a malfunction of the fuel cell 3.

The detection module 92 has for inputs the voltage measured by the voltage sensor 90 and the signal transmitted by the voltage comparator 7 to the transmission unit 76. It is programed for comparing the measured voltage to a maximum voltage, and for emitting a malfunction signal of the fuel cell 3 when the measured voltage is greater than the maximum voltage and the signal transmitted by the voltage comparator 7 to the transmission unit 76 consists in the blocking set value. This malfunction signal is typically transmitted to an emergency stopping module, suitable for controlling the stopping of the electric system 1 subsequently to the reception of the malfunction signal, or to a device for presenting information for informing a user on the malfunction.

Figure 6:
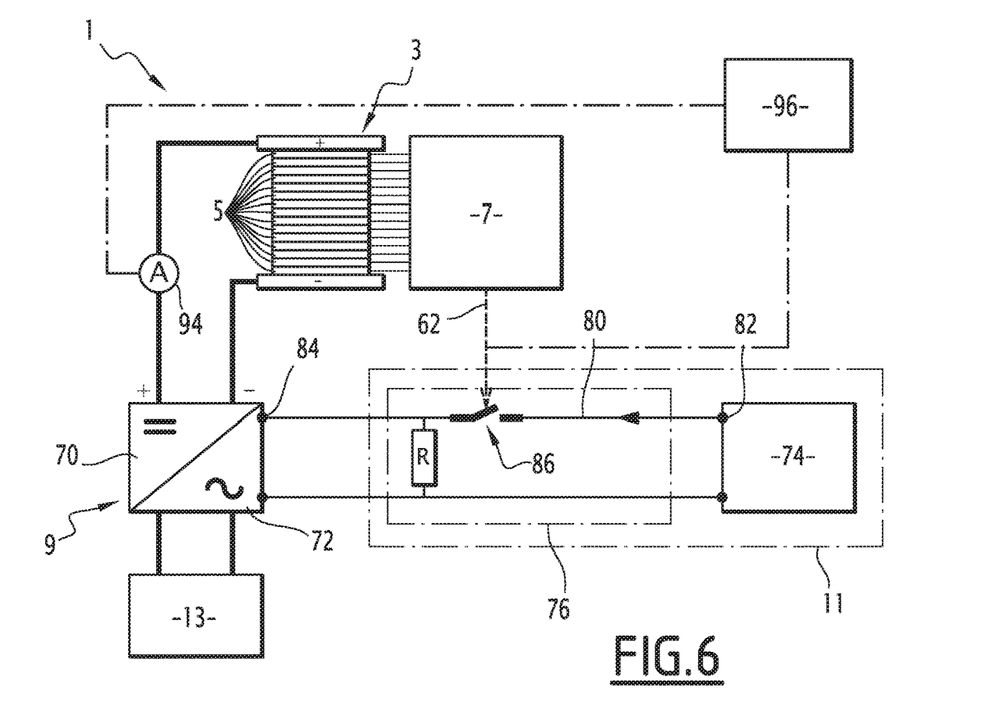
FIG. 6 is a schematic view of an alternative of the electric system of FIG. 1.

In the alternative illustrated in FIG. 6, the electric system 1 comprises a current sensor 94, for measuring the intensity of a current leaving the fuel cell 3, and a module 96 for detecting a malfunction of the fuel cell 3.

The detection module 96 has for inputs the intensity measured by the current sensor 94 and the signal transmitted by the voltage comparator 7 to the transmission unit 76. It is programed for comparing the measured intensity with a minimum intensity and for emitting a malfunction signal of the fuel cell 3 when the measured intensity is less than the minimum intensity and the signal transmitted by the voltage comparator 7 to the transmission unit 76 consists in the blocking set value. This malfunction signal is typically transmitted to an emergency stopping module, suitable for controlling the stopping of the electric system 1 subsequently to the reception of the malfunction signal, or to a device for presenting information for informing a user on the malfunction.

A method for controlling the electric system 1 will now be described, with reference to FIGS. 1 and 6.

The electric system 1 is first of all set into operation. For this purpose, the fuel cell 3 is supplied with oxidizing and reducing fluids, and a control set value is generated by the set value generator 74 so that the output current of the converter 9 is adapted to the load 13. Under the effect of the oxidation-reduction reaction which occurs in each cell 5 of the fuel cell 3, a potential difference greater than $V_{min}-\Delta V$ is established between the terminals of the cell. All the phototransistors 36 of the voltage comparator 7 are then closed, so that the output signal of the voltage comparator 7 consists in the transmission set value. The switch 86 is then also closed, so that the control set value is transmitted to the converter 9, which is thus operating.

At any instant, the voltage on the terminals of one of the cells 5 of the fuel cell 3 passes below the value $V_{min}-\Delta V$. This voltage drop is detected by means of the opening of the phototransistor 40 associated with said cell 5, which has the effect of switching the output 62 of the voltage comparator 7 to the reference potential $V_0$. The output signal of the voltage comparator 7 then consists in the blocking set value. Accordingly, the switch 86 opens, and the control set value stops being transmitted to the converter 9, which stops.

The converter 9 being stopped, there is no more energy taken on the stack 3. The latter nevertheless continuing to be supplied with oxidizing and reducing fluids, the voltage on the terminals of the cells 5 rises so that all the voltage values return to above the value $V_{min}-\Delta V$. This rise in voltage is detected by the closing of the phototransistor 40 which was open, which has the effect of returning the output 62 of the voltage comparator 7 to the positive potential $V^+$. The switch 86 also closes and the control set value is again transmitted to the converter 9, which restarts.

It will be noted that the voltages on the terminals of the cells 5 may rise very rapidly after stopping the converter 9, so that the stopping of the converter 9 only lasts a fraction of a second. The load 13 thus does not see any cut-off of its electric power supply by the electric system 1, but simply a limitation of the electric power which the electric system 1 may provide it.

By means of the embodiment of invention described above, the untimely safety stops of the electric system 1 are avoided. The electric power distributed by the electric system 1 is simply limited according to the performances of the fuel cell 3.

Further, the fuel cell 3 may be utilized with a maximum of its capabilities, without ever entering an operating region in which the degradation of the electrochemical cells 5 would be accelerated. A benefit is even drawn from the limited capabilities of the fuel cell 3 at the end of its life, while these limited capabilities cause in the production systems of the state of the art multiple untimely stops making the stack not utilizable.

Further, the electric system 1 is simple and inexpensive to produce.

Finally, in spite of a different use of the voltage comparator 7 as compared with the production systems of the state of the art, the malfunctions of the fuel cell 3 remain monitored, which gives the possibility when necessary to stop the electric system 1 when this is necessary.

Figure 7:
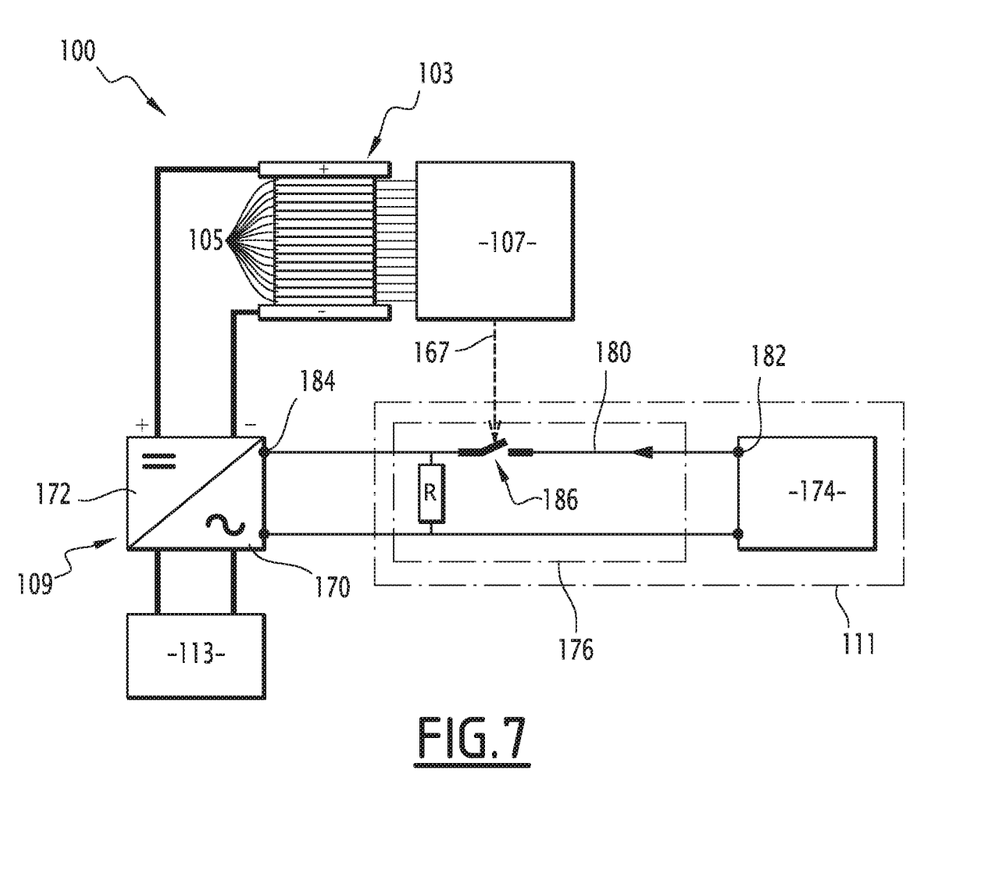
FIG. 7 is a schematic view of an electric system according to a second embodiment of the invention, electrically connected to a source.

The electric system 100, illustrated in FIG. 7, is an electrolysis system. It comprises an electrolyzer formed by a stack 103 of electrochemical cells 105, for producing dioxygen and dihydrogen by electrolysis of water, a voltage comparator 107 for individually comparing the voltage on the terminals of each cell 105 of the electrolyzer 103 with a threshold voltage, an electric converter 109 for converting the electric power current from the electrolyzer 103, and a module 111 for controlling the converter 109. The electric system 100 is electrically connected to a source 113 for producing the consumed electric energy by the system 100.

Figure 8:
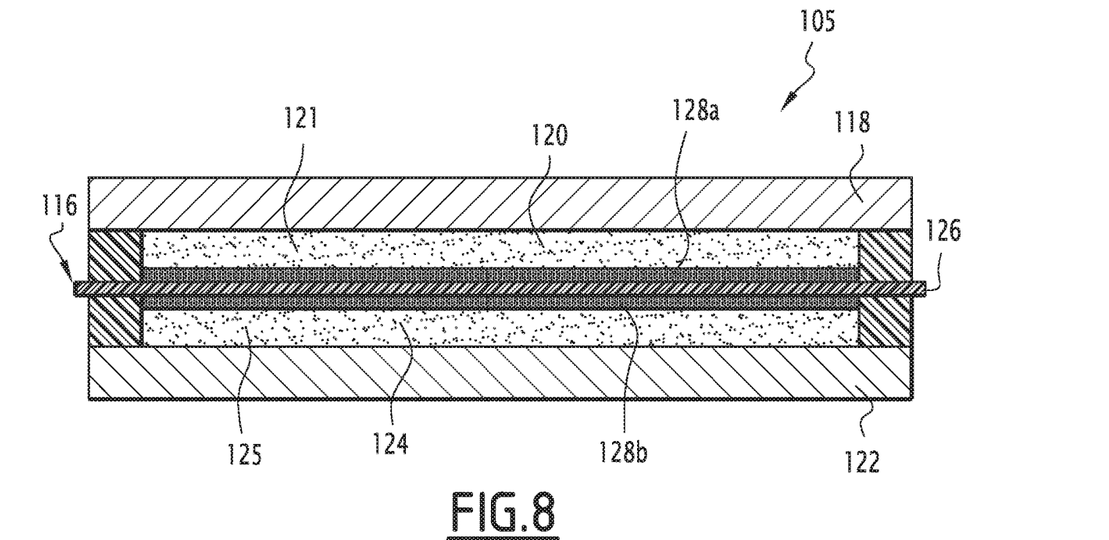
FIG. 8 is a schematic sectional view of an electrochemical cell of an electrolyzer of the electric system of FIG. 7.

A cell 105 of the electrolyzer 103 is illustrated in FIG. 8. It comprises a membrane-electrode assembly 116 inserted between an anode plate 118 and a cathode plate 122.

The membrane-electrode assembly 116 comprises an ion exchange membrane 126 sandwiched between an anode 128a and a cathode 128b.

The membrane 126 electrically insulates the anode 128a from the cathode 128b.

The membrane 126 is adapted so as to only let through charged ions, preferably cations cross it. The membrane 126 is generally a proton exchange membrane, suitable for only letting protons cross it. The membrane 126 is typically in a polymeric material.

The anode 128a and the cathode 128b are positioned on opposite faces of the membrane 126. They are each formed with a porous medium comprising a catalyst, typically platinum or a platinum alloy, for facilitating the reaction.

The anode plate 118 delimits with the membrane-electrode assembly 116 an anode compartment 120 for circulation of the water intended to be electrolyzed and collection of the dioxygen stemming from the electrolysis reaction. This anode compartment 120 extends along the face of the membrane 126 bearing the anode 128a.

The anode compartment 120 contains a porous matrix 121. Preferably, as illustrated, the porous matrix 121 has a shape which substantially mates that of the anode compartment 120.

The anode plate 118 is formed with an electrically conductive material, typically titanium.

The cathode plate 122 delimits with the membrane-electrode assembly 116 a cathode compartment 124 for collecting the dihydrogen from the electrolysis reaction. This cathode compartment 124 extends along the face of the membrane 126 bearing the cathode 128b.

The cathode compartment 124 contains a porous matrix 125. Preferably, as illustrated, the porous matrix 125 has a shape which substantially makes that of the cathode compartment 124.

The cathode plate 122 is formed with an electrically conductive material, typically titanium.

The membrane 126 separates the dioxygen from the dihydrogen produced by the electrolysis. It is positioned between the anode plate 118 and the cathode plate 122 of the cell 105 and insulates the latter electrically from each other.

The anode 128a is in electric contact with the anode plate 118. The cathode 128b is in electric contact with the cathode plate 122. During operation of the electrolyzer 3, at the anode 128a electrolysis of the water occurs under the effect of the potential difference applied between the anode and cathode plates 118, 122. The thereby formed dioxygen ions yield an electron to the anode plate, so as to form dioxygen, while the hydrogen ions migrate through the membrane 126 to the cathode compartment 124, where they recover electrons and assemble for forming dihydrogen.

The cell 105 is stacked with other similar cells, the anode plate 118 of each cell being in contact with the cathode plate 122 of the neighbouring cell. The anode and cathode plates 118, 122 thus ensure transfer of the ions from the dioxygen ions collected in the anode compartment 124 of another cell. The anode 118 and cathode 122 plates of two neighbouring cells of the stack are preferably made in the same material and therewith and form together a bipolar plate.

The cells 105 are electrically connected in series with each other, so that the voltage on the terminals of the stack 103 is equal to the sum of the voltages on the terminals of the cells 105.

Figure 9:
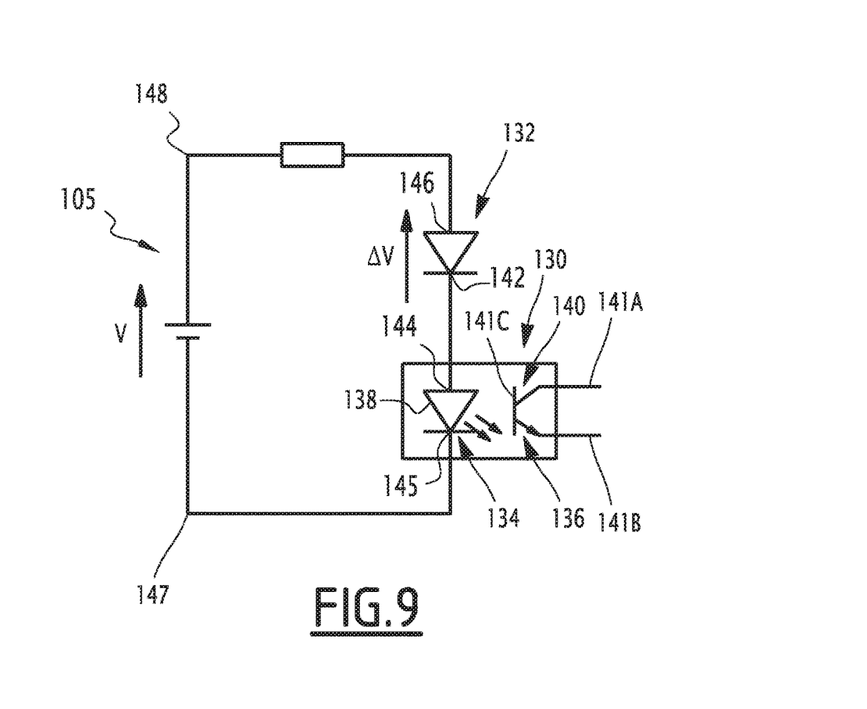
FIG. 9 is a schematic view of a detail of a voltage comparator of the electric system of FIG. 7.

With reference to FIG. 9, the voltage comparator 107 comprises, for each cell 105 of the electrolyzer 103, a device 130 for controlling the voltage on the terminals of said cell 105. It further comprises a voltage-regulating device 132, laid out so that the control device 130 measures the voltage V on the terminals of the cell 105, lowered by a fixed shift voltage $\Delta V$.

The voltage V is typically comprised between 0.5 and 1.0V, during normal operation of the cell 105. The shift voltage $\Delta V$ is the voltage on the terminals of the regulating device 132. Preferably, the shift voltage $\Delta V$ is comprised between 0.3V and 1V.

The control device 130 is formed by an active optical device, typically an optocoupler. It comprises an input 134, electrically connected to the cell 105, for measurement of its voltage V, and an output 136, for the construction of an image of the measured voltage V. The input 134 and the output 136 are electrically insulated.

The input 134 comprises a light-emitting diode 138, adapted for emitting photons when the voltage on its terminals is greater than a threshold voltage $V_{min}$. During normal operation of the cell 105, the threshold voltage $V_{min}$ is greater than the difference of the voltages V and $\Delta V$, so that the light-emitting diode 138 does not emit any photons. The threshold voltage $V_{min}$ is typically comprised between 0.8 and 1.2V.

The output 136 comprises a phototransistor 140 adapted so as to be in a closed configuration, i.e. electrically connecting its collector 141A and its emitter 141B to each other, when its base 141C receives photons, and in order to be in an open configuration, i.e. electrically insulating its collector 141A and its emitter 141B relatively to each other, when its base 141C does not receive any photons.

The phototransistor 140 is optically coupled with the light-emitting diode 138. In other words, the light-emitting diode 138 and the phototransistor 140 are laid out so that the photons emitted by the diode 138 reach the base 141C of the phototransistor 140. The passing of the phototransistor 140 from its open configuration to its closed configuration is thus controlled by the state of the light-emitting diode 138.

The regulating device 132 is a passive electric device. In particular, the regulating device 132 is a diode, typically a Schottky diode, advantageous because not very expensive and giving a fixed shift voltage and may easily be controlled. The diode is oriented so as to let through the currents from the areas with a high potential to the areas of lower potential. Thus, during normal operation, the voltage on the terminals of the regulating device 132, which is also the shift voltage $\Delta V$, is equal to the threshold voltage of the diode.

The regulating device 132 comprises a first terminal 142, electrically connected to a terminal 144 of the input 134 of the control device 130. The first terminal 142 is in a direct electric connection with the terminal 144, i.e. there is no electric component inserted between the terminals 142 and 144. The other terminal 145 of the input 134 of the control device 130 is in a direct electric connection with a low potential terminal 147 of the cell 105.

The regulating device 132 also comprises a second terminal 146, electrically connected to a high potential terminal 148 of the cell 105. In other words, the second terminal 146 is electrically connected to the anode plate 118 of the cell 105. A resistor 150 is inserted between the second terminal 146 and the terminal 148, in order to limit the intensity of the current crossing the regulating device 132.

The control device 130 thereby measuring the voltage V of the cell 105 lowered by the shift voltage $\Delta V$, the voltage V may vary over a wider range before the voltage on the terminals of the input 134 of the control device 130 passes above the threshold voltage $V_{min}$.

Figure 10:
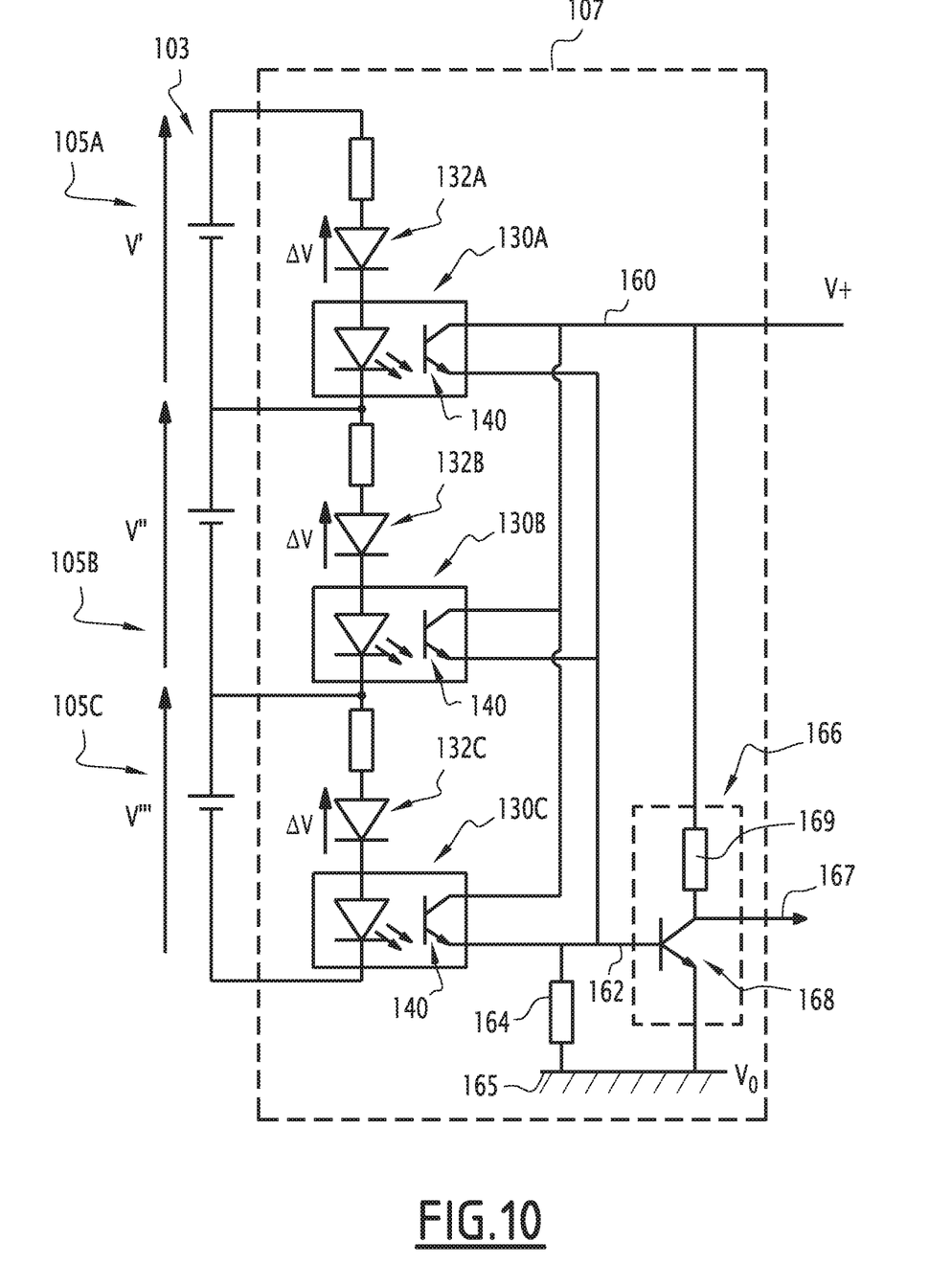
FIG. 10 is a schematic view of the voltage comparator of the electric system of FIG. 7.

With reference to FIG. 10, the voltages V', V", V''' on the terminals of cells 105A, 105B, 105C of the electrolyzer 103 are each measured by a control device, 130A, 130B, 130C respectively of the voltage comparator 107. In the same way as for the cell 105 illustrated in FIG. 9, a regulating device, 132A, 132B, 132C respectively is provided for each cell 105A, 105B, 105C, so that the associated control device 130A, 130B, 130C measures the voltage V', V", V'" lowered by a shift voltage $\Delta V$.

It will be noted that, for the sake of clarity of the figure, the number of illustrated cells of the electrolyzer 103 has been limited to three, but this number is by no means limiting, the electrolyzer 103 may comprise more or less than these three electrochemical cells. Preferably, the electrolyzer 103 comprises a large number of electrochemical cells, for example greater than a hundred.

The threshold voltage $V_{min}$ is preferably substantially the same for all the control devices 130A, 130B, 130C, and the shift voltage $\Delta V$ is preferably substantially the same for all the regulating devices 132A, 132B, 132C. The maximum voltage of each cell 105A, 105B, 105C beyond which the associated phototransistor 140 closes is therefore substantially the same for all the cells 105A, 105B, 105C.

The outputs 136 of the control devices 130A, 130B, 130C are connected in parallel with each other, between a positive potential $V^+$ (typically 5 volts) line 160 and an intermediate line 162. A resistor 164 is electrically inserted between the line 162 and a line 165 with the reference potential $V_0$.

Thus, as long as all the phototransistors 140 of the control devices 130A, 130B, 130C are open, the potential of the intermediate line 162 is equal to the reference potential $V_0$. If on the other hand the potential of the intermediate line 162 switches to the positive potential $V^+$, it is a sign that one of the phototransistors 140 is closed, and therefore excessive power is applied to the electrolyzer 103.

Always with reference to FIG. 10, the voltage comparator 107 also comprises a voltage inverter 166 interposed electrically between the intermediate line and an output line 167, in order to provide on its output line 167 an inverted voltage relatively to the voltage of the intermediate line 162.

For this purpose, the voltage inverter 166 comprises a transistor 168, the base of which is electrically connected to the intermediate line 162, the emitter is electrically connected to the line 165 and the collector is electrically connected to the output line 167 and, via a resistor 169, to the line 160. Thus, when the intermediate line 162 is at the reference potential $V_0$, the transistor 168 is open and the output line 167 is therefore at the positive potential $V^+$, and when the intermediate line 162 is at the positive potential $V^+$, the transistor 168 is closed and the output line 167 is therefore at the reference potential $V_0$.

Returning to FIG. 7, the converter 109 is adapted for shaping the electric energy produced by the source 113 for its consumption by the system 100. It comprises an input 170 for an alternating current electrically connected to the terminals of the source 113, and an outlet 172 of DC current electrically connected to the terminals of the electrolyzer 103. The converter 109 is in the illustrated example an AC/DC converter. Alternatively, the converter 109 is a DC/DC converter.

The converter 109 is controlled by the control module 111.

The control module 111 comprises a generator for a control set value 174 and a transmission unit 176 for the control set value to the converter 109.

The control set value generator 174 is programmed so as to generate a converter control set value 109, for example of the pulse width modulation type, adapted so that the current leaving the converter 109 through its output 172 is adapted to the electrolyzer 103. Such control set value generators are known to one skilled in the art.

The transmission unit 176 comprises an electric line 180 electrically connecting an output terminal 182 for the control set value of the generator 174 to a reception terminal 184 for the control set value by the converter 109. The transmission unit 176 further comprises a controlled switch 186 for selectively opening and closing the electric line 180. The controlled switch 186 is typically a transistor, for example a phototransistor or a field effect transistor with a metal-oxide gate.

The voltage comparator 107 is adapted for transmitting a control signal for the controlled switch 186 to the transmission unit 176, said signal consisting in a transmission set value for the control set value when the voltage on the terminals of each cell 105 is less than the voltage $V_{min}+\Delta V$, and in a set value for blocking the control set value as soon as one of the voltages on the terminals of the cells 105 is greater than or equal to the voltage $V_{min}+\Delta V$, so that the transmission unit 176 transmits the control set value to the converter 109 when it receives the transmission set value and blocks the control set value when it receives the blocking set value.

For this purpose, the output 167 of the voltage comparator 107 is electrically connected to the transmission unit 176.

In particular, in the case when the controlled switch 186 is a field effect transistor with a metal-oxide gate, the output 162 of the voltage comparator 107 is electrically connected to the gate of the transistor. In the case when the controlled switch 186 is a phototransistor, the output 162 is electrically connected to a light-emitting diode adapted for emitting photons when the voltage on its terminals is greater than a threshold voltage less than the positive potential $V^+$, the light-emitting diode being optically coupled with the phototransistor.

Thus, when the output 167 is at the positive potential $V^+$, the switch 186 is closed and the control set value is transmitted to the converter 109 and when the output 162 is a at the reference potential $V_0$, the switch 186 is open and the control set value is not transmitted to the converter 109.

The signal transmitted by the outlet 162 to the transmission unit 176 therefore consists in an alternation of square waves at the positive potential $V^+$ and of square waves at the reference potential $V_0$, each square wave at the positive potential $V^+$ forming a transmission set value of the control set value, and each square wave at the reference potential $V_0$ forming a blocking set value of the control set value.

The source 113 is for example a central unit or an electric network.

A method for controlling the electric system 100 will now be described, with reference to FIG. 7.

The electric system 100 is first of all set into operation. For this purpose, the electrolyzer 103 is supplied with water, and a control set value is generated by the set value generator 174 so that the output current of the converter 109 is adapted to the electrolyzer 103. Under the effect of the electric current provided by the source 113, a potential difference less than $V_{min}+\Delta V$ is established between the terminals of each cell 105. All the phototransistors 136 of the voltage comparator 107 are then open, so that the output signal of the voltage comparator 107 consists in the transmission set value. The switch 186 is therefore also closed so that the control set value is transmitted to the converter 109, which is thereby operating.

At any instant, the voltage on the terminals of one of the cells 105 of the electrolyzer 103 passes above the value $V_{min}+\Delta V$. This rise in voltage is detected by the closure of the phototransistor 140 associated with said cell 105, which has the effect of switching the output 167 of the voltage comparator 107 to the reference potential $V_0$.

The output signal of the voltage comparator 107 then consists in the blocking set value. Accordingly, the switch 186 opens, and the control set value stops being transmitted to the converter 109, which stops.

The converter 109 being stopped, there is no longer any energy transmitted to the electrolyzer 103. The latter nevertheless continuing being supplied with water, the voltage on the terminals of the cells 105 drops so that all the voltage values return to below the value $V_{min}+\Delta V$. This voltage drop is detected by the opening of the phototransistor 140 which was closed, which has the effect of returning the output 167 of the voltage comparator 107 to the positive potential $V^+$. The switch 186 closes again and the control set value is again transmitted to the converter 109, which restarts.

It will be noted that the voltages on the terminals of the cells 105 may very rapidly drop after stopping the converter 109, so that the stopping of the converter 109 generally last only a fraction of a second. The source 113 therefore does not see the cut-off of its load by the electric system 100, but simply a limitation of the electric power which the electric system 100 may absorb.

By this second embodiment, the electrolyzer 103 may be utilized to the maximum of its capabilities, without ever entering into an operating range in which the degradation of the electrochemical cells 105 would be accelerated.

Further, the electric system 100 is simple and inexpensive to produce.

What is claimed is:

1. An electric system, comprising:
    a stack of electrochemical cells electrically connected in series to each other so that a voltage on terminals of the stack is equal to a sum of voltages on terminals of the electrochemical cells;
    an electric converter electrically connected to the terminals of the stack;
    a voltage comparator for comparing the voltage on the terminals of at least one group of at least one electrochemical cell of the stack at a threshold voltage; and
    a controller for controlling the converter, the controller comprises a generator for generating a control set value of the converter and a transmission unit for transmission of the control set value to the converter, the voltage comparator being configured for transmitting a signal to the transmission unit, the signal consisting, when the compared voltage is greater than the threshold voltage, in a first set value from among a transmission set value for transmission of the control set value and a blocking set value for blocking of the control set value, and in a second set value from among the transmission and blocking set values when the compared voltage is less than or equal to the threshold voltage, the transmission unit being configured for transmitting the control set value to the converter when the transmission unit receives the transmission set value, and for blocking the control set value when the transmission unit receives the blocking set value.

2. The electric system according to claim 1, wherein each electrochemical cell of the stack belongs to a group for which the voltage is compared with a threshold voltage by the voltage comparator.

3. The electric system according to claim 1, wherein the voltage comparator is configured for comparing the voltage on the terminals of each group of a plurality of groups of at least one electrochemical cell with a threshold voltage associated with said group, and for transmitting to the transmission unit the second set value as soon as one of the compared voltages is less than or equal to the associated threshold voltage.

4. The electric system according to claim 1, wherein the transmission unit comprises a controlled switch controlled by the signal transmitted by the voltage comparator.

5. The electric system according to claim 4, wherein the controlled switch is a transistor.

6. The electric system according to claim 5, wherein the controlled switch is a phototransistor or a field effect transistor with a metal-oxide gate.

7. The electric system according to claim 1, wherein the voltage comparator is configured for individually comparing the voltage between the terminals of each electrochemical cell of the stack with a threshold voltage associated with the electrochemical cell, and for transmitting to the transmission unit the second set value as soon as one of the compared voltages is less than or equal to the associated threshold voltage.

8. The electric system according to claim 7, wherein the voltage comparator comprises, for each electrochemical cell of the stack, a control device for controlling the voltage between the terminals of said cell, and a voltage-regulating device, electrically connected to said cell so that the control device measures the voltage between the terminals of the cell, lowered by a shift voltage between the terminals of the voltage-regulating device.

9. The electric system according to claim 7, wherein the voltage comparator comprises, for each electrochemical cell of the stack, a control device for controlling the voltage between the terminals of said cell, and a voltage-regulating device, electrically connected to said cell so that the control device measures the voltage between the terminals of the cell, increased by a shift voltage between the terminals of the voltage-regulating device.

10. The electric system according to claim 1, comprising a voltage sensor for measuring the voltage between the terminals of the stack and a detector for detecting a malfunction of the stack, the detector having as inputs the voltage measured by the voltage sensor and the signal transmitted by the voltage comparator to the transmission unit.

11. The electric system according to claim 10, wherein the detector is programmed for comparing the measured voltage to a maximum voltage, and for emitting a malfunction signal signalling a malfunction of the stack when the measured voltage is greater than the maximum voltage and the signal transmitted by the voltage comparator to the transmission unit consists in the blocking set value.

12. The electric system according to claim 1, comprising a current sensor for measuring the intensity of the current leaving the stack and a detector for detecting a malfunction of the stack, the detector having as inputs the intensity measured by the current sensor and the signal transmitted by the voltage comparator to the transmission unit.

13. The electric system according to claim 12, wherein the detector is programmed for comparing the measured intensity to a minimum intensity, and for emitting a malfunction signal signalling a malfunction of the stack when the measured intensity is less than the minimum intensity and the signal transmitted by the voltage comparator to the transmission unit consists in the blocking set value.

14. A method for controlling an electric system according to claim 1, comprising the following successive steps:
    comparing a compared voltage between the terminals of at least one group of at least one electrochemical cell with a threshold voltage, the compared voltage being greater than the threshold voltage, the converter being in operation, detecting a drop in the compared voltage to a value less than that of the threshold voltage, stopping the converter, detecting an increase in the compared voltage to a value above that of the threshold voltage, and restarting the converter.

15. A method for controlling an electric system according to claim 1, comprising the following successive steps:

comparing a compared voltage between the terminals of at least one group of at least one electrochemical cell with a threshold voltage, the compared voltage being less than the threshold voltage, the converter being in operation, detecting a rise in the compared voltage to a value greater than that of the threshold voltage, stopping the converter, detecting a drop in the compared voltage to a value less than that of the threshold voltage, and restarting the converter.

\* \* \* \* \*